United States Patent [19]
Flynn et al.

[11] Patent Number: 5,846,271
[45] Date of Patent: Dec. 8, 1998

[54] MULTI-STAGE COMPRESSED GAS FILTER

[75] Inventors: Paul E. Flynn, Wernersville; Peter D. Wersant, Sinking Spring; Howard M. Sherer, Allentown, all of Pa.

[73] Assignee: Reading Technologies, Inc., Reading, Pa.

[21] Appl. No.: 889,647

[22] Filed: Jul. 8, 1997

[51] Int. Cl.⁶ ..................................................... B01D 50/00
[52] U.S. Cl. .......................... 055/315; 055/318; 055/322; 055/482; 055/486; 055/DIG. 17
[58] Field of Search ............................... 55/315, 316, 318, 55/322, 323, 275, 482, 486, DIG. 17

[56] References Cited

U.S. PATENT DOCUMENTS

| | | | |
|---|---|---|---|
| 4,692,175 | 9/1987 | Frantz | 55/323 |
| 4,897,094 | 1/1990 | Maeda | 55/323 |
| 4,957,516 | 9/1990 | Daniels | 55/323 |
| 5,145,497 | 9/1992 | Maeda | 55/323 |
| 5,385,592 | 1/1995 | Maeda | 55/323 |
| 5,409,514 | 4/1995 | Ragusa et al. | 55/323 |

FOREIGN PATENT DOCUMENTS

WO8809694  12/1988  WIPO .................... 55/523

*Primary Examiner*—Jay H. Woo
*Assistant Examiner*—Minh-Chau T. Pham
*Attorney, Agent, or Firm*—Synnestvedt & Lechner

[57] ABSTRACT

A filter for removing contaminants from compressed gas is disclosed. The filter features an inverse flow regime wherein gas entering the filter first flows downwardly and then reverses direction before encountering any filter media. The filter has a connection head with a gas inlet, a gas outlet and oppositely disposed openings separated by a central partition. The openings are sealingly enclosed by elongated tubular housings which releasably attach to the head. The gas inlet communicates with one side of the partition and the outlet communicates with the opposite side. A plurality of individual filter elements are arranged on either side of the partition and filter out aerosol, vapor and particulate contaminants from the compressed gas. The filter elements are releasably mounted to the central partition and can be removed and replaced independently of one another. The tubular housings are vertically oriented and a valve is provided in the bottom of the lower housing to drain accumulated liquid from the filter.

15 Claims, 4 Drawing Sheets

MULTI-STAGE COMPRESSED GAS FILTER

FIELD OF THE INVENTION

This invention relates to filters for filtering contaminants such as solid particles, aerosols, water vapor and oil vapor from compressed gas.

BACKGROUND OF THE INVENTION

Compressed gases such as compressed air, nitrogen, oxygen, helium and so forth are used extensively throughout a wide spectrum of industries such as automotive, chemical, electronic, aerospace, oil refining and health care industries to name but a few. There is often a need in these industries for compressed gas which is free of contaminants such as particulate matter, aerosols (liquid droplets), water vapor, oil vapor or other undesired agents. For example, if used to spray paint, it is important that oil, water and particulate matter be removed from the compressed air to prevent the paint from becoming contaminated, thereby ruining the paint finish. Similarly, if compressed air provides a source of breathing air, for example, by SCUBA divers, firemen, air crew members or hospital patients, it is critical that particulate and oil contaminants be removed from the air to prevent ingestion of the contaminants into the lungs of the person.

Gas compressors themselves are often the source of contaminants in compressed gas. Air drawn into a compressor, for example, is often not properly filtered at the compressor intake, thus allowing particulates commonly in the air, such as pollen, smoke and dust, to be drawn in and introduced into the compressed air supply. The moving parts of compressors such as pistons or impellers are lubricated with oils which can vaporize, atomize, oxidize or otherwise breakdown due to agitation by the moving parts and the increase in temperature associated with compressing a gas. The lubricating oil or its breakdown by-products become entrained in the compressed gas either as an aerosol (oil droplets suspended in air) or a vapor (oil in the gaseous state) as the gas leaves the compressor. Finally, water is a natural component of air, and unless deliberately removed, water will comprise a natural part of compressed air as well in both aerosol (water droplet) and vapor (gaseous) form.

SUMMARY AND OBJECTS OF THE INVENTION

The invention provides a multi-stage filter to remove contaminants such as particles, water vapor and aerosols, oil vapor and aerosols and the like from compressed gases. The multi-stage filter comprises a connection head having upper and lower oppositely facing receptacles separated by a partition. The partition has first and second sides within each receptacle. An aperture through the partition provides communication between the two receptacles. Within the connection head is an inlet for the compressed gas, the inlet being connected to a gas inlet passageway which extends through the head to the first side of the partition. A gas outlet passageway extends from the second side of the partition through the head to a gas outlet.

Two elongated tubular housings are releasably attached to the connection head, a respective housing enclosing each of the upper and lower openings. Within each elongated housing is at least one filter element, the elements being disposed on the opposite sides of the partition and releasably attached to a respective side. The filter elements sealingly surround the aperture through the partition such that gas passing through one filter element will then pass through the aperture and into the other filter element. A first of the filter elements has a gas impermeable sidewall leading to an open end arranged opposite to the partition where gas can enter the first filter element. The impermeable side wall is disposed in a spaced apart relationship with the surrounding tubular housing, thus forming a duct from the partition to first filter element open end.

The gas impermeable sidewall construction of the first filter element provides an inverse flow regime to the filter, whereby compressed gas entering the gas inlet is directed to the inlet passageway which channels the gas to the first side of the partition, whereupon the gas travels lengthwise of the gas impermeable sidewall (through the duct formed between the sidewall and the elongated housing) and, abruptly changing direction, the gas then enters the first filter element at the end of the sidewall opposite from the partition. Passing in a counterflow direction through the first filter element, the gas passes through the partition aperture and into a second of the filter elements on the second side of the partition and in coaxial alignment with the first. The gas passes through the second filter element and into the outlet passage which channels the gas to the compressed gas outlet where the gas exits the filter.

The inverse flow regime greatly aids in the separation of water aerosol entrained in the gas, much of the water separating from the gas when the gas reverses direction to enter the first filter element. It is therefore preferable to orient the filter vertically with the first filter element positioned beneath the second because a vertical orientation allows water separated from the gas to accumulate at the bottom of the lower elongated housing where it can be drained by a valve positioned at the housing bottom. It is likewise preferable to have the first filter element be a coalescing type which separates water aerosol from the gas as well. Water separated from the gas by the coalescing filter element will drain to the bottom of the lower elongated housing along with the water separated by the gas flow reversal; the water can then be removed via the valve as described above.

To dry the gas further by removing water vapor it is preferable to use a desiccant type filter element as the second filter element. Desiccant filters adsorb and retain a large fraction of the water vapor in the gas and must be replaced when they become saturated and are no longer effectively removing the vapor. It is preferable to use desiccant material which has a colorimetric indicator, i.e., the desiccant material changes color as it becomes saturated with water, a complete color change of the filter media indicating when the filter element should be replaced. When a colorimetric desiccant filter is used as the second filter element it is convenient to have a means to view the filter element for periodic inspection and servicing. To this end the elongated housing enclosing the upper opening of the connection head is made from a transparent material which allows a full view of the second filter element. Since the elongated housings are releasably attached to the head and the filter elements are releasably mounted on the partition changing filter elements can be accomplished quickly and easily by simple routine maintenance procedures.

Oil can also be removed from the gas via either a coalescing filter as the second filter element. Coalescing filters remove oil aerosol entrained in the gas. Oil retained in a coalescing filter element effects a visible discoloration of the filter media indicating oil saturation and the need to change the filter element. A transparent elongated housing greatly facilitates visual inspection of oil adsorbing colorimetric filter elements and oil coalescing filter elements as described above for water vapor filters.

A third filter element is preferably mounted within the gas impermeable sidewall of the first filter element in coaxial alignment with the first filter element. It is advantageous to use the third filter element to trap and remove particulate contaminants from the gas such as pollen, dust, smoke particles and the like. It is preferable to locate the particulate filter element downstream of the water coalescing filter so that the particulate filter remains relatively dry during filter operation.

It is an object of the invention to provide a single filter for compressed gas having multiple filter elements which can filter a plurality of different types of contaminants from the gas.

It is an object of the invention to provide a filter having an inverse flow regime.

It is another object of the invention to provide a filter which allows for visual inspection of the individual filter elements.

It is a further object of the invention to provide a filter wherein the individual filter elements are readily and easily replaced independently of one another.

BRIEF DESCRIPTION OF THE DRAWINGS

FIG. 3a shows an isometric view of a desiccant filter element;

DETAILED DESCRIPTION OF THE PREFERRED EMBODIMENT

Figure 1:
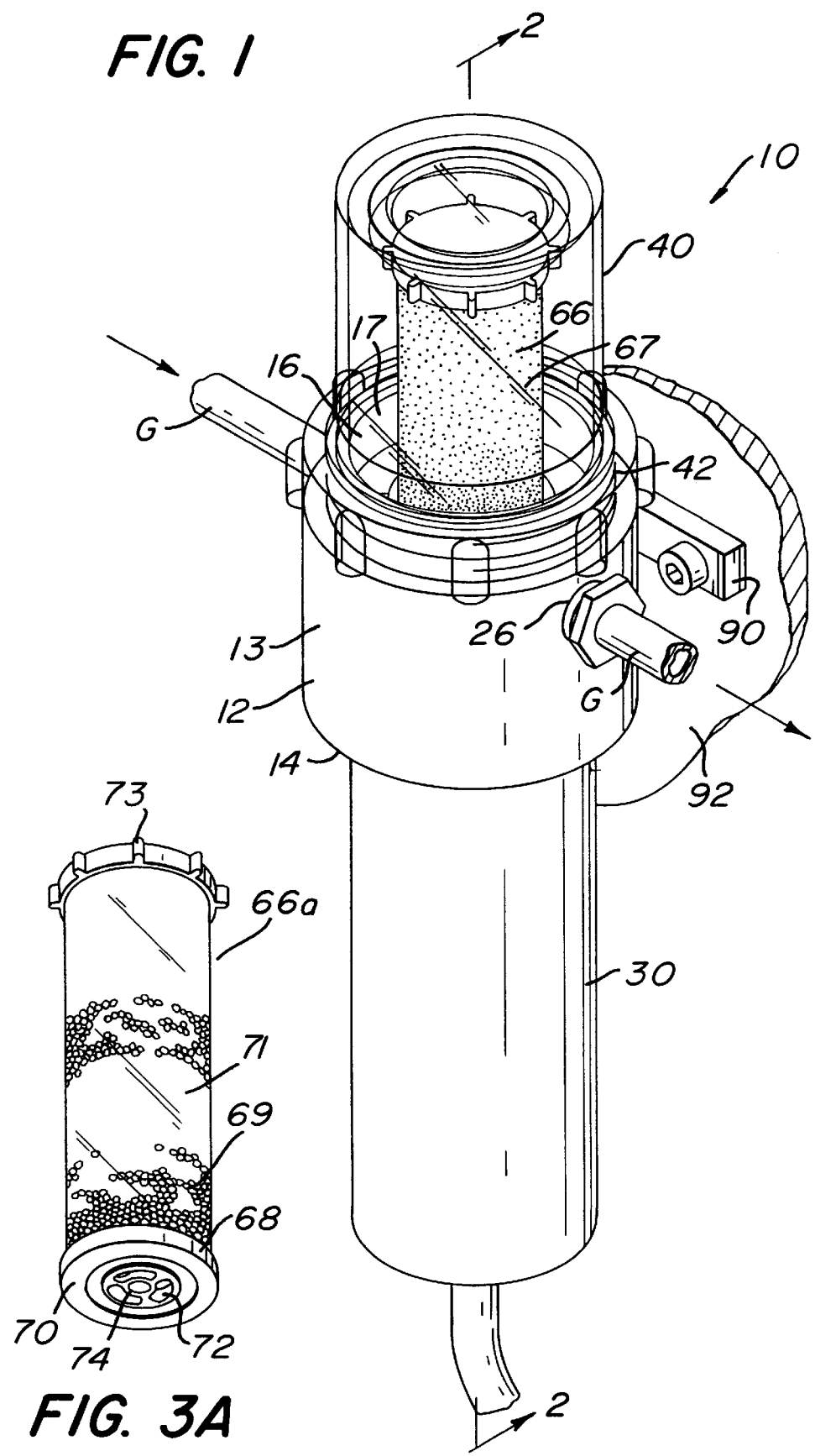
FIG. 1 shows an isometric view of a preferred embodiment of a filter according to the invention.
Figure 2:
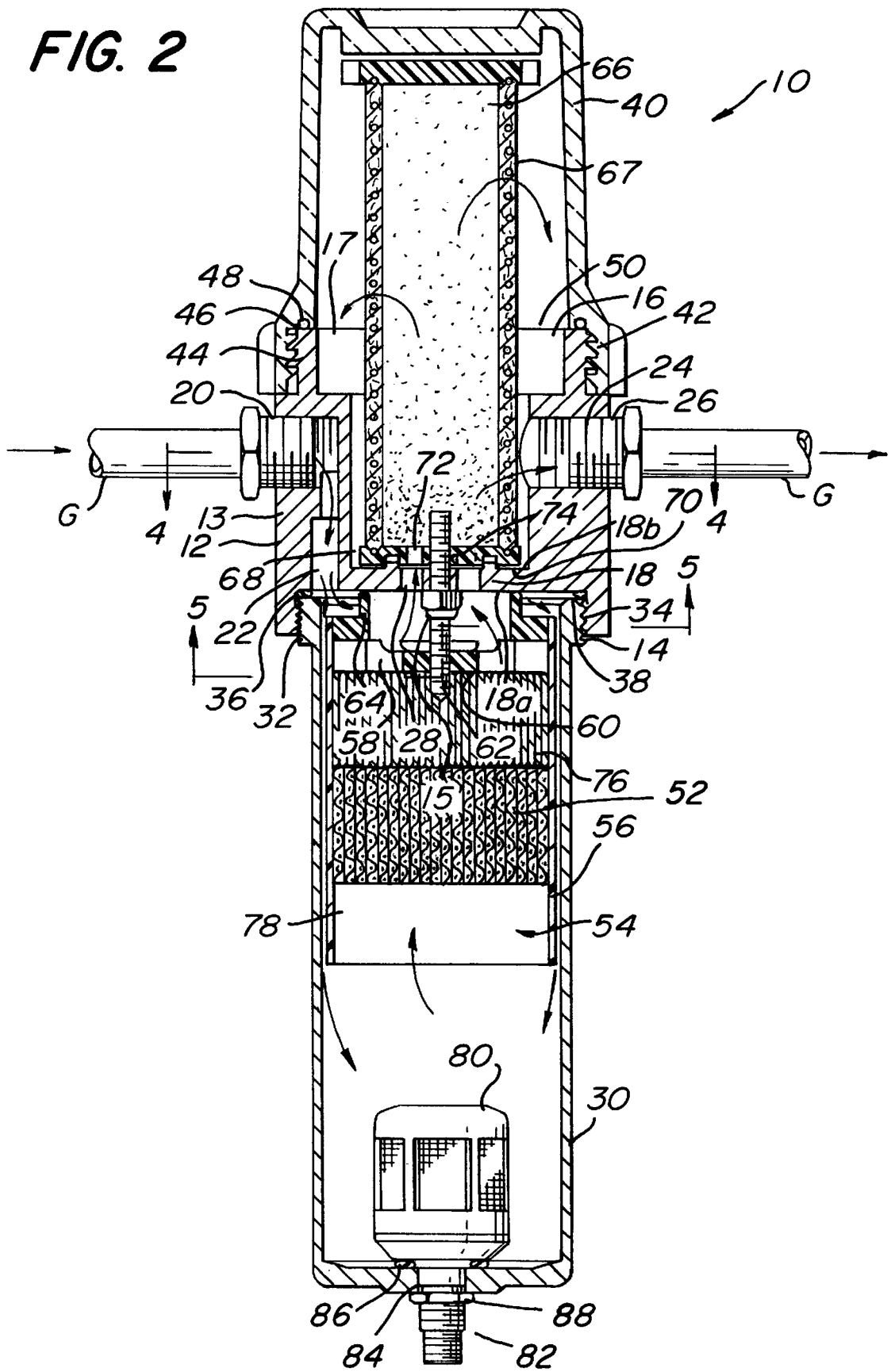
FIG. 2 shows a sectional elevational view of the filter taken along line 2—2 of FIG. 1.

In FIG. 1, a filter 10 according to the invention comprises a connection head 12 formed by a peripheral wall 13 having a lower opening 14 oppositely disposed from an upper opening 16 separated by a partition 18 best seen in FIG. 2. Openings 14 and 16, in conjunction with partition 18, form lower receptacle 15 and upper receptacle 17 for receiving filter elements described below. Connection head 12 further has a compressed gas inlet 20 which communicates with a gas inlet passageway 22 extending through head 12 to a first side 18a of partition 18. Connection head 12 further has a gas outlet passageway 24 extending from a second side 18b of partition 18, the passageway communicating with a gas outlet 26. Preferably, gas inlet 20 and gas outlet 26 are coaxially aligned on opposite sides of connection head 12, thus allowing filter 10 to be readily inserted into a straight run of a compressed gas line "G" without modifying the gas line by jogging the line to account for inlet and outlet misalignment on the filter connection head 12. Partition 18 has an array of spaced apertures 28, best illustrated in FIGS. 2 and 3, apertures 28 providing communication between lower receptacle 15 and upper receptacle 17. Connection head 12 is preferably formed from a strong and durable material such as steel or an aluminum alloy and may be cast or machined.

Figure 3:
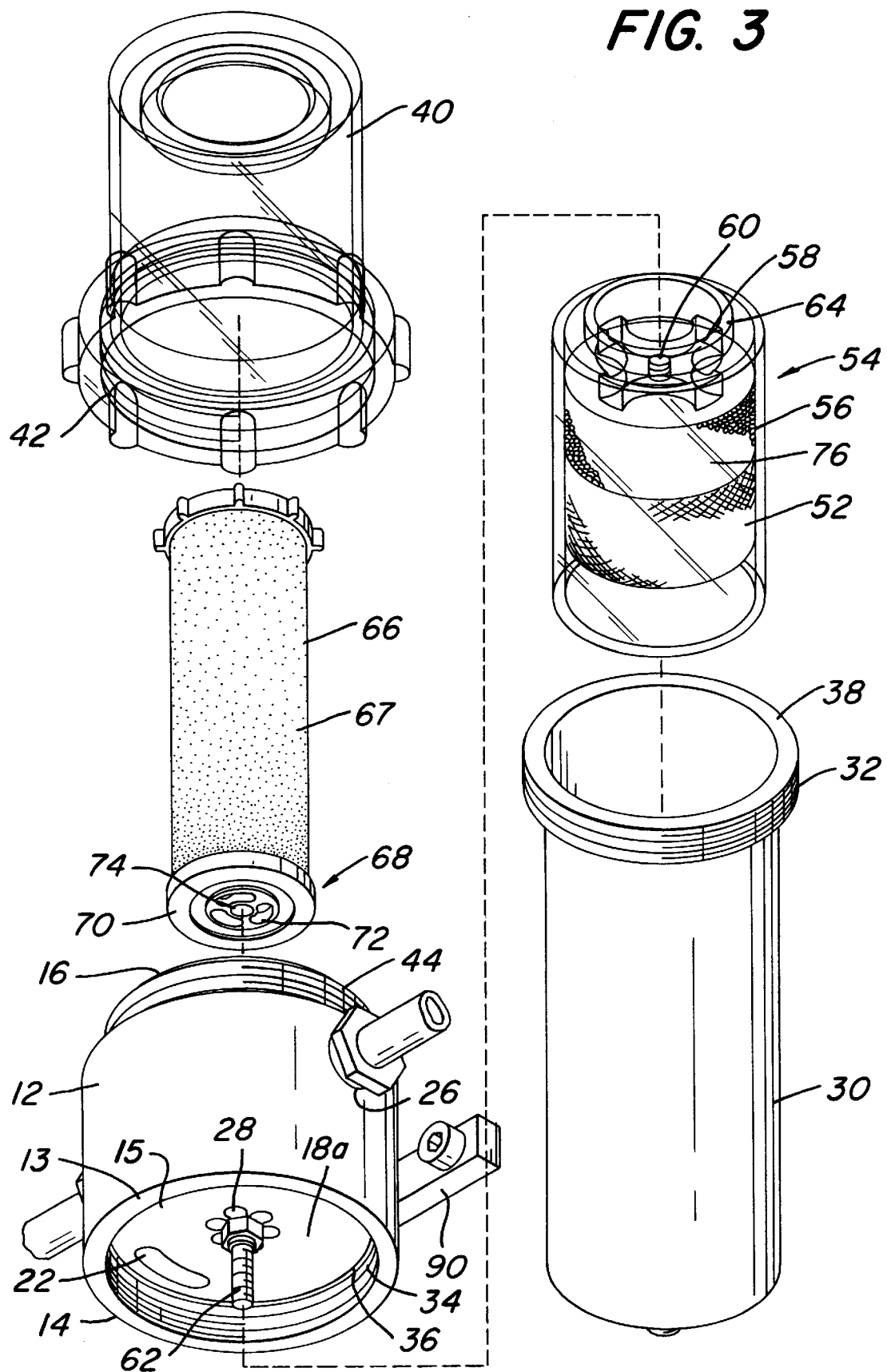
FIG. 3 shows an exploded isometric view of the filter according to the invention.

Lower opening 14 is enclosed by a first elongated tubular housing 30 which is releasably attached to head 12, prefer-ably by integral screw threads 32 at one end of housing 30 engaging mating screw threads 34 disposed around lower opening 14 as seen in FIGS. 2 and 3. First housing 30 sealingly engages head 12 by means of an o-ring seal 36. When housing 30 engages lower opening 14 o-ring 36 is compressed between partition first side 18a and a lower housing sealing surface 38 disposed on lower housing 30 adjacent to integral screw threads 32. Similarly, upper opening 16 is enclosed by a second elongated tubular housing 40. Second housing 40 is releasably attached to head 12 via integral screw threads 42 on housing 40 engaging mating screw threads 44 disposed on head 12 around opening 16 as illustrated in FIGS. 2 and 3. Second housing 40 sealingly engages head 12 via an o-ring 46 retained within an annular cavity 48 circumferentially disposed adjacent to integral screw threads 42. O-ring 46 is compressed between cavity 48 and a raised sealing surface 50 disposed around upper opening 16 to effect the seal as best seen in FIG. 2.

Preferably, second housing 40 is formed from a transparent material, such as polycarbonate, allowing individual filter elements, described below, to be viewed for inspection and maintenance. First housing 30 is formed from the same material as connection head 12.

Figure 5:
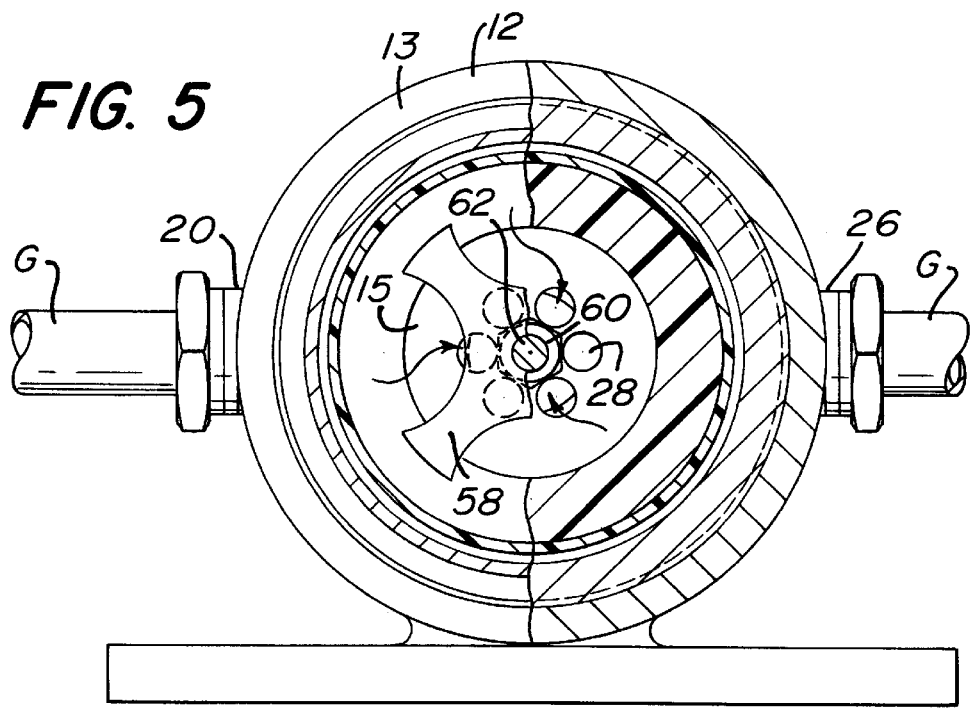
FIG. 5 shows a plan cross sectional view of the filter taken along line 5—5 of FIG. 2.

As shown in FIG. 2, at least two filter elements are disposed within filter 10 on opposite sides of partition 18. A first filter element 52 is positioned below partition first side 18a within first housing 30. Filter element 52 is disposed within the bore of a tube 54 seen in detail in FIG. 3. Tube 54 has a gas impermeable sidewall 56 attached to a cruciform mounting structure 58 located at one end of the tube as best shown in FIGS. 3 and 5. Mounting structure 58 has a threaded hole 60 at its center which engages a mounting stud 62 which projects substantially perpendicularly from the center of partition 18. Engagement of the threads of mounting stud 62 with the threads of hole 60 allows tube 54 to be quickly and easily releasably mounted on partition 18. A raised lip 64 extends from the mounting end of tube 54 and sealingly surrounds aperture array 28 in partition 18 by engaging first partition side 18a when tube 54 threadedly engages stud 62. The opposite end of tube 54 is open to allow gas to enter and pass through the filter elements as described below.

A second filter element 66 or 66a (illustrated in FIGS. 3 and 3a) is disposed within second elongated tubular housing 40 as seen in FIG. 2. Both types of second filter elements 66 and 66a have a bottom 68 preferably composed of a pliant material such as rubber or plastic. The bottom, shown in detail in FIGS. 3 and 3a, comprises a filter sealing surface 70, gas apertures 72 to permit gas to enter filters 66 and 66a and a threaded mounting hole 74. Preferably, threaded stud 62 passes through the partition 18 and projects upwardly so that it can be threadedly received within the hole 74. Filter sealing surface 70 sealingly engages second partition side 18b and surrounds aperture array 28 in partition 18.

A third filter element 76 is preferably placed within tube 54 interposed between first filter element 52 and mounting structure 58. With multiple filter elements 52, 66 and 76 within the same filter 10 it is possible for one filter 10 to remove a plurality of different types of contaminants from a compressed gas as described in detail below.

In the preferred embodiment first filter element 52 is a coalescing filter comprising a bed of stainless steel mesh for removing water aerosol (water droplets) entrained in the compressed gas. Third filter element 76 comprises a particulate filter, such as a bed of cotton polyester yarn and stainless steel wire for trapping particulates such as pollen, dust, smoke and the like. The second filter element desirably comprises an oil coalescing filter, such as a borosilicate glass microfibers cylinder 67 for removing oil aerosols (illustrated at 66 in FIG. 3). Alternately, the filter element could comprise a water desiccant filter, as illustrated at 66a in FIG. 3a. Filter element 66a contains desiccant material 69, preferably aluminum oxide fired at high temperatures as marketed, for example, by ALCOA Industrial Chemicals Division as Product No. F200. Alternative materials include molecular sieves, silica gel and various disposables, as are known in the art. However, silica gel is a less desirable material in that it tends to fractionate and disposables are expensive to dispose of due to environmental concerns and regulations. The operation of these filter elements is described below. It is preferable that the second filter element have calorimetric properties, i.e., that the filter element undergo a visual color change as it becomes saturated, indicating when the filter element should be changed.

Filter Operation

As seen in FIG. 2, contaminated compressed gas flows through gas line G and enters compressed gas inlet 20 in connection head 12 and passes further through gas inlet passageway 22 where the gas stream exits passage 22 and enters an annular space or duct 78 between tube sidewall 56 and first tubular housing 30. Because tube 54 is sealingly attached to partition 18 and sidewall 56 is impermeable the gas must flow lengthwise of tube 54 into first housing 30 and then reverse direction to continue into the open end of tube 54. The ducting action of sidewall 56 and first housing 30 creates an inverse flow regime within the filter 10 whereby the contaminated gas stream must abruptly reverse direction to pass through the filter elements. The reversal of the gas stream serves to separate water droplets entrained in the gas. The gas also undergoes a change in velocity, slowing down as it transitions from the relatively small cross-sectional area of duct 78 to the relatively large area of tube 54. The velocity reduction aids in the condensing of water vapor from the gas and reduces the likelihood of condensed droplets becoming entrained in the gas. The water thus separated accumulates at the bottom of housing 30 which is equipped with a drain valve 80. Drain valve 80 has a threaded nipple 82 which passes outwardly through an aperture 84 in the bottom of housing 30. Aperture 84 is sealed by a gasket 86 compressed between drain valve 80 and the bottom of housing 30 by the action of retaining nut 88 which pulls valve 80 against gasket 86 when retaining nut 88 is tightened. Water which accumulates at the bottom of housing 30 is drained by opening drain valve 80, which is preferably a float type valve which opens automatically when the water reaches a predetermined level. Drain valve 80 is otherwise normally closed.

Because considerable water is separated from the gas due to the inverse flow regime it is highly desirable to orient filter 10 vertically as shown in FIGS. 1 and 2 by positioning first housing 30 vertically below connection head 12 and have the gas first pass downwardly into housing 30 and then reverse direction and flow upwardly into the open end of tube 54 where the gas encounters the first filter element 52. Water droplets still entrained in the gas after the flow reversal are separated by coalescing action as the gas stream flows upwardly through the stainless steel mesh bed of filter element 52. Separated water drains from filter element 52 into the bottom of housing 30 where it is in turn removed from housing 30 through drain valve 80 as described above.

Figure 4:
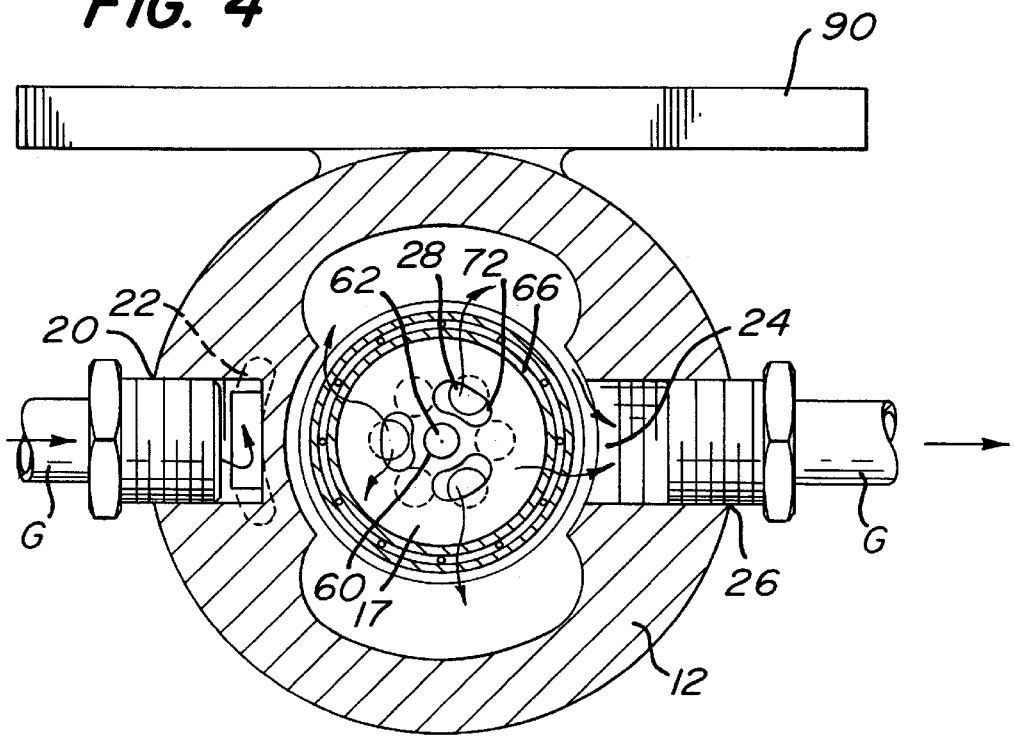
FIG. 4 shows a plan cross sectional view of the filter taken along line 4—4 of FIG. 2.

The gas stream next encounters third filter element 76 where particulate matter is entrapped in a bed of cotton polyester mesh and stainless steel wire. Leaving filter element 76, the gas, free of condensed water and particulate contaminants, passes by mounting structure 58 and through aperture array 28 in partition 18, as seen in FIGS. 2 and 5. Because filter sealing surface 70 sealingly surrounds aperture array 28 on the second partition side 18b the gas must pass upwardly through gas apertures 72 and into second filter element 66 as seen in FIGS. 2 and 4.

The water vapor still entrained in the compressed gas as the gas leaves filter element 76 may be removed through the use of a water desiccant media as second filter element 66a. Second filter element 66a comprises a transparent gas impermeable container 71 attached to filter bottom 68. The container holds a bed of desiccant material 69, preferably comprised of aluminum oxide spheres. Gas containing water vapor enters filter element 66a through gas apertures 72 and is forced upwardly through the entire desiccant bed, exiting container 71 through exit vents 73 at the top of the container. As the gas passes through the desiccant, the water vapor is adsorbed and retained in the filter; the compressed gas, now free of water aerosols, particulates and water vapor, flows within second elongated housing 40 into gas outlet passage 24 and exits filter 10 through gas outlet 26.

When the second filter element 66a is a desiccant filter to remove water vapor, it will periodically become saturated with moisture and will no longer effectively remove water vapor from the gas. Preferably, a colorimetric material, such as silica gel beads coated with cobalt chloride, is used to indicate saturation. The beads change color from blue to pink to white upon saturation giving a visual indication that the filter element 66a requires changing. Second housing 40 is made of a transparent material to allow maintenance personnel to observe the color of the beads within filter element 66a without removing housing 40. Filter 10 is furthermore designed to enable the filter elements to be changed independently of one another by simply unscrewing the respective housing (30 or 40) from connection head 12, unscrewing the spent filter element (66a or tube 54) from mounting stud 62, replacing the spent filter element with a new filter element and reattaching the respective housing.

It is frequently desirable to remove oil from the gas, and for this purpose, the second filter element comprises an oil coalescing filter, as illustrated by filter element 66. Oil aerosols are effectively removed by means of a borosilicate glass microfibers cylinder 67 comprising filter element 66 as shown in FIGS. 2 and 3. Oil coalescing on the borosilicate fibers causes the normally white fibers to discolor, thus visually signaling when the filter element needs replacing.

Filter 10 is preferably provided with a mounting bracket 90 which is attached to connection head 12 and allows filter 10 to be supported on an external structure 92 as illustrated in FIG. 1. The bracket permits vertical orientation of the filter 10 and prevents the weight of the filter from being borne on gas line G.

Filter 10 can be installed in a branch of a compressed air system to supply contaminant free compressed air for specific applications. The capability of filter 10 to remove a plurality of contaminants from the compressed air allows filter 10 to replace multiple individual filtering units designed to filter out only one specific type of contaminant. Preferably, filter 10 is disposed in close proximity to the station at which the compressed air will be used, for example, at a spray painting booth. Filter 10 is further advantageously positioned to permit maintenance personnel easy access to inspect the condition of the various filter elements within the filter and readily replace the elements as needed.

We claim:

1. An apparatus for filtering a plurality of different contaminants from gas, said apparatus comprising:
   a connection head having upper and lower oppositely disposed openings;
   a partition separating said openings, said partition having a lower side facing toward said lower opening, an upper side facing toward said upper opening, and an aperture therethrough;
   a gas inlet and a gas inlet passageway extending from said inlet through said connection head to said partition lower side;
   a gas outlet passageway extending from above said partition upper side through said connection head and including a gas outlet;
   upper and lower tubular housings;
   means for releasably attaching said tubular housings to said head, said upper and lower tubular housings sealingly enclosing said upper and lower openings respectively;
   a lower filter element disposed within said lower housing for removing a first contaminant from the gas;
   an upper filter element comprising a coalescing filter disposed within said upper housing for removing oil aerosol from the gas, said coalescing filter comprising borosilicate glass microfibers;
   said upper and lower filter elements each having separate attachment means at one end for releasably attaching said filter elements to respective partition sides independent of each other;
   said upper and lower filter elements each having sealing means at said one end for sealingly attaching said filter elements to said respective partition sides in surrounding relationship with said aperture;
   said lower filter element further having elongated impermeable sidewalls having an opening in the end opposite said one end, said sidewalls being disposed adjacent to said lower housing in a spaced apart relationship forming a duct from said partition lower side to said opening;
   the gas entering at said inlet and flowing through said inlet passageway to said duct, the gas further flowing downwardly through said duct to said opening in said other end of said lower filter element, next flowing upwardly through said lower filter element, then passing upwardly through said aperture and through said upper filter element, the gas then passing through said gas outlet passageway and exiting through said gas outlet.

2. Apparatus according to claim 1, wherein the first contaminant comprises liquid droplets and said lower filter element comprises a second coalescing filter element for separating the liquid droplets from the gas, the liquid coalescing and accumulating in said lower housing.

3. Apparatus according to claim 2, wherein said second coalescing filter element comprises a bed of stainless steel wire mesh disposed within said sidewalls.

4. Apparatus according to claim 2, wherein said lower housing comprises a valve arranged beneath said lower filter element, said valve being normally closed, said valve for draining the liquid from said lower housing.

5. Apparatus according to claim 1, wherein said upper filter element has indicating means for visually indicating oil saturation and said upper housing has transparent means for visually observing said indicating means.

6. Apparatus according to claim 1, wherein a second lower filter element is arranged within said sidewalls and interposed between said lower filter element and said opening, said second lower filter element for removing a third contaminant from the gas, the third contaminant being different from both the first contaminant and the oil aerosol.

7. Apparatus according to claim 6, wherein the third contaminant comprises solid particles and said second lower filter element comprises an entrapping element for removing the solid particles from the gas.

8. Apparatus according to claim 7, wherein said entrapping element comprises a bed of cotton polyester yarn and stainless steel wire.

9. Apparatus according to claim 1, wherein said inlet and said outlet are coaxially aligned on opposite sides of said head.

10. Apparatus for filtering contaminants from a gas, said apparatus comprising:
    a connection head having a peripheral wall;
    a partition subdividing said connection head into upper and lower receptacles;
    aperture means in said partition for establishing communication between said upper and said lower receptacle;
    said connection head having a compressed gas inlet and a compressed gas inlet passage, said inlet being positioned in said peripheral wall and said inlet passage extending from said inlet through said peripheral wall to said lower receptacle;
    said connection head having a compressed gas outlet and a compressed gas outlet passage, said outlet being positioned in said peripheral wall and said outlet passage extending from said upper receptacle through said peripheral wall to said outlet;
    a first filter element disposed within said lower receptacle, said first filter element having a first end having a first end opening and a second end having a second end opening and filter media for filtering out water aerosol and particulate materials;
    means for releasably securing said first filter element in sealing relationship with said partition within said lower receptacle with said first end opening being in communication with said aperture;
    a coalescing filter element comprising borosilicate glass microfibers disposed within said upper receptacle, said coalescing filter element having a first end having a first end opening;
    means for releasably securing said coalescing filter element in sealing relationship with said partition within said upper receptacle with said first end opening of said coalescing filter element disposed in communication with said aperture;
    lower and upper tubular housings for respectively sealingly enclosing said first and said coalescing filter elements within said lower and upper receptacles, said lower tubular housing having a sidewall surrounding said first filter element lengthwise in a spaced apart relationship thereby forming a duct communicating between said lower receptacle and said first filter element second end opening;
    means on said connection head for mounting said apparatus with the tubular housings extended vertically;
    the gas entering said connection head through said inlet and flowing through said inlet passage into said lower receptacle, the gas next flowing downwardly through said duct to said second end opening of said first filter element, the gas then reversing direction and flowing upwardly into said second opening, said filter elements and said aperture means providing a substantially vertical flow path for the gas through said first filter element, said aperture means and the first end opening of the coalescing filter element, the gas passing through the coalescing filter element into said upper receptacle and through said outlet passage exiting said connection head through said outlet.

11. Apparatus according to claim 10 having threaded connector means including first threaded portions coaxially positioned on said partition and second threaded portions coaxially positioned on the first end of the first filter element and the first end of the coalescing filter element, said first and second threaded portions being independently interengagable for selective removal and replacement of said filter elements.

12. Apparatus according to claim 10, wherein said second housing comprises a transparent portion, said transparent portion for viewing filter media of said coalescing filter element.

13. Apparatus according to claim 12, wherein said coalescing filter element has colorimetric means for visually indicating when said coalescing filter element is saturated with oil by changing color.

14. Apparatus according to claim 10, wherein said inlet and outlet are coaxially disposed on opposite sides of said connection head.

15. Apparatus according to claim 10, wherein said lower tubular housing comprises a valve disposed beneath said first filter element and communicating between the inside of said lower housing and the outside, said valve being normally closed, said valve being openable to drain water filtered out of the gas by said first filter element.

* * * * *